US012549901B2

(12) United States Patent
Makinen et al.

(10) Patent No.: US 12,549,901 B2
(45) Date of Patent: Feb. 10, 2026

(54) SPATIAL AUDIO FILTERING WITHIN SPATIAL AUDIO CAPTURE

(71) Applicant: Nokia Technologies Oy, Espoo (FI)

(72) Inventors: Toni Henrik Makinen, Pirkkala (FI); Mikko Tapio Tammi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 576 days.

(21) Appl. No.: 17/958,553

(22) Filed: Oct. 3, 2022

(65) Prior Publication Data

US 2023/0106162 A1 Apr. 6, 2023

(30) Foreign Application Priority Data

Oct. 4, 2021 (GB) ..................................... 2114187

(51) Int. Cl.
*H04R 5/04* (2006.01)
*H04R 3/04* (2006.01)

(52) U.S. Cl.
CPC ................. *H04R 5/04* (2013.01); *H04R 3/04* (2013.01); *H04R 2430/20* (2013.01)

(58) Field of Classification Search
CPC .................................... H04R 5/04; H04R 3/04
See application file for complete search history.

(56) References Cited

U.S. PATENT DOCUMENTS 10,154,361 B2 * 12/2018 Tammi ...................... H04S 7/30
2014/0348342 A1 11/2014 Laaksonen et al. ............ 381/92
2015/0249899 A1 9/2015 Kuech et al. .......................... 5/5
2015/0286459 A1 * 10/2015 Habets ....................... G06F 3/16 700/94
2017/0332170 A1 * 11/2017 Laaksonen ............. H04R 3/005
2019/0324117 A1 10/2019 Lin et al. ............................ 5/26
2019/0394606 A1 12/2019 Tammi et al. .................... 7/303
2021/0076130 A1 3/2021 Laitinen et al. ....................... 3/5
2021/0266693 A1 8/2021 Raghuvanshi et al. ........... 7/303

FOREIGN PATENT DOCUMENTS

GB 2540175 A 1/2017
GB 2559765 A * 8/2018 ........... G10L 19/008
GB 2590650 A 7/2021
WO WO-2018/234625 A1 12/2018
WO WO-2021/160465 A1 8/2021

* cited by examiner

*Primary Examiner* — Olisa Anwah
(74) *Attorney, Agent, or Firm* — McCarter & English LLP

(57) ABSTRACT

An apparatus including circuitry configured to: obtain two or more audio signals from respective two or more microphones; determine, in one or more frequency band of the two or more audio signals, a first sound source direction parameter and first sound source energy parameter based on processing of the two or more audio signals; determine, in the one or more frequency band of the two or more audio signals, a second sound source direction parameter and second sound source energy parameter based on processing of the two or more audio signals; obtain a region defining a direction and/or range for a filter; and generate the filter to be applied to the two or more audio signals, wherein filter gain/attenuation parameters are generated based on the region in relation to the first sound source direction parameter, the first sound source energy parameter, the second sound source direction parameter and the second sound source energy parameter.

21 Claims, 12 Drawing Sheets

SPATIAL AUDIO FILTERING WITHIN SPATIAL AUDIO CAPTURE

FIELD

The present application relates to apparatus and methods for spatial audio filtering within spatial audio capture.

BACKGROUND

Spatial audio capture with microphone arrays is utilized in many modern digital devices such as mobile devices and cameras, in many cases together with video capture. Spatial audio capture can be played back with headphones or loudspeakers to provide the user with an experience of the audio scene captured by the microphone arrays.

Parametric spatial audio capture methods enable spatial audio capture with diverse microphone configurations and arrangements, thus can be employed in consumer devices, such as mobile phones. Parametric spatial audio capture methods are based on signal processing solutions for analysing the spatial audio field around the device utilizing available information from multiple microphones. Typically, these methods perceptually analyse the microphone audio signals to determine relevant information in frequency bands. This information includes for example direction of a dominant sound source (or audio source or audio object) and a relation of a source energy to overall band energy. Based on this determined information the spatial audio can be reproduced, for example using headphones or loudspeakers. Ultimately the user or listener can thus experience the environment audio as if they were present in the audio scene within which the capture devices were recording.

The better the audio analysis and synthesis performance the more realistic is the outcome experienced by the user or listener.

SUMMARY

There is provided according to a first aspect an apparatus comprising means configured to: obtain two or more audio signals from respective two or more microphones; determine, in one or more frequency band of the two or more audio signals, a first sound source direction parameter and first sound source energy parameter based on processing of the two or more audio signals; determine, in the one or more frequency band of the two or more audio signals, a second sound source direction parameter and second sound source energy parameter based on processing of the two or more audio signals; obtain a region defining a direction and/or range for a filter; and generate the filter to be applied to the two or more audio signals, wherein filter gain/attenuation parameters are generated based on the region in relation to the first sound source direction parameter, the first sound source energy parameter, the second sound source direction parameter and the second sound source energy parameter.

The means configured to generate a filter to be applied to the two or more audio signals, wherein filter gain/attenuation parameters are generated based on the region in relation to the first sound source direction parameter, the first sound source energy parameter, the second sound source direction parameter and the second sound source energy parameter may be configured to: generate a first band gain/attenuation value based on the first sound source direction parameter being within or outside the region; generate a second band gain/attenuation value based on the second sound source direction parameter being within or outside the region; and combine the first band gain/attenuation value and the second band gain/attenuation value to generate a combined band gain/attenuation value.

The means configured to obtain the region defining the direction and/or range for the filter may be configured to obtain at least one of: a direction and range defining the region, together with a in-band gain/attenuation factor based on the sound source direction parameter being within the region, and an out-band gain/attenuation factor based on the sound source direction parameter being outside the region; and a direction and range defining the region, together with a in-band gain/attenuation factor based on the sound source direction parameter being within the region, and an out-band gain/attenuation factor based on the sound source direction parameter being outside the region and a further range defining an edge zone region, together with an edge-zone band gain/attenuation factor based on the sound source direction parameter being within the edge-zone region.

The means configured to generate the filter to be applied to the two or more audio signals, wherein filter gain/attenuation parameters are generated based on the region in relation to the first sound source direction parameter, the first sound source energy parameter, the second sound source direction parameter and the second sound source energy parameter may be configured to: generate a first temporal gain/attenuation value based on a temporal average of the mean band value of the first sound source energy parameter and the number of times the first sound source direction parameter is within the region over a defined time period; generate a second temporal gain/attenuation value based on a temporal average of the mean band value of the second sound source energy parameter and the number of times the second sound source direction parameter is within the region over the defined time period; and generate a combined temporal gain/attenuation value based on a combination of the first temporal gain/attenuation value and the second temporal gain/attenuation value to generate a combined temporal gain/attenuation value.

The means configured to generate the filter to be applied to the two or more audio signals, wherein filter gain/attenuation parameters are generated based on the region in relation to the first sound source direction parameter, the first sound source energy parameter, the second sound source direction parameter and the second sound source energy parameter may be configured to: generate a combined frame averaged value based on a combination of a frame averaged first sound source energy parameter and frame averaged second sound source energy parameter; generate a frame smoothing gain/attenuation based on the combined frame averaged value and the number of times the first and second sound source direction parameter is within the filter region over a frame period.

The means configured to generate the filter to be applied to the two or more audio signals, wherein filter gain/attenuation parameters are generated based on the region in relation to the first sound source direction parameter, the first sound source energy parameter, the second sound source direction parameter and the second sound source energy parameter may be configured to generate the filter gain/attenuation for the band based on a combination of the frame smoothing gain/attenuation, the combined temporal gain/attenuation value and the combined band gain/attenuation value.

The processing of the two or more audio signals may be configured to provide one or more modified audio signal based on the two or more audio signals, and wherein the means configured to determine, in the one or more frequency band of the two or more audio signals, a second sound source direction parameter and second sound source energy parameter based on processing of the two or more audio signals may be configured to determine, in the one or more frequency band of the two or more audio signals, a second sound source direction parameter and second sound source energy parameter based on the modified audio signal.

The means configured to provide one or more modified audio signals based on the two or more audio signals may be further configured to: generate a modified two or more audio signals based on modifying the two or more audio signals with a projection of a first sound source defined by the first sound source direction parameter; and the means configured to determine, in the one or more frequency band of the two or more audio signals, at least a second sound source direction parameter at least based in at least in part the one or more modified audio signal is configured to determine in the one or more frequency band of the two or more audio signals, the at least a second sound source direction parameter by processing the modified two or more audio signals.

The means configured to obtain the region defining the direction and/or range for the filter may be configured to obtain the region based on a user input.

According to a second aspect there is provided a method for an apparatus, the method comprising: obtaining two or more audio signals from respective two or more microphones; determining, in one or more frequency band of the two or more audio signals, a first sound source direction parameter and first sound source energy parameter based on processing of the two or more audio signals; determining, in the one or more frequency band of the two or more audio signals, a second sound source direction parameter and second sound source energy parameter based on processing of the two or more audio signals; obtaining a region defining a direction and/or range for a filter; and generating the filter to be applied to the two or more audio signals, wherein filter gain/attenuation parameters are generated based on the region in relation to the first sound source direction parameter, the first sound source energy parameter, the second sound source direction parameter and the second sound source energy parameter.

Generating a filter to be applied to the two or more audio signals, wherein filter gain/attenuation parameters are generated based on the region in relation to the first sound source direction parameter, the first sound source energy parameter, the second sound source direction parameter and the second sound source energy parameter may comprise: generating a first band gain/attenuation value based on the first sound source direction parameter being within or outside the region; generating a second band gain/attenuation value based on the second sound source direction parameter being within or outside the region; and combining the first band gain/attenuation value and the second band gain/attenuation value to generate a combined band gain/attenuation value.

Obtaining the region defining the direction and/or range for the filter may comprise at least one of: a direction and range defining the region, together with a in-band gain/attenuation factor based on the sound source direction parameter being within the region, and an out-band gain/attenuation factor based on the sound source direction parameter being outside the region; and a direction and range defining the region, together with a in-band gain/attenuation factor based on the sound source direction parameter being within the region, and an out-band gain/attenuation factor based on the sound source direction parameter being outside the region and a further range defining an edge zone region, together with an edge-zone band gain/attenuation factor based on the sound source direction parameter being within the edge-zone region.

Generating the filter to be applied to the two or more audio signals, wherein filter gain/attenuation parameters are generated based on the region in relation to the first sound source direction parameter, the first sound source energy parameter, the second sound source direction parameter and the second sound source energy parameter may comprise: generating a first temporal gain/attenuation value based on a temporal average of the mean band value of the first sound source energy parameter and the number of times the first sound source direction parameter is within the region over a defined time period; generating a second temporal gain/attenuation value based on a temporal average of the mean band value of the second sound source energy parameter and the number of times the second sound source direction parameter is within the region over the defined time period; and generating a combined temporal gain/attenuation value based on a combination of the first temporal gain/attenuation value and the second temporal gain/attenuation value to generate a combined temporal gain/attenuation value.

Generating the filter to be applied to the two or more audio signals, wherein filter gain/attenuation parameters are generated based on the region in relation to the first sound source direction parameter, the first sound source energy parameter, the second sound source direction parameter and the second sound source energy parameter may comprise: generating a combined frame averaged value based on a combination of a frame averaged first sound source energy parameter and frame averaged second sound source energy parameter; and generating a frame smoothing gain/attenuation based on the combined frame averaged value and the number of times the first and second sound source direction parameter is within the filter region over a frame period.

Generating the filter to be applied to the two or more audio signals, wherein filter gain/attenuation parameters are generated based on the region in relation to the first sound source direction parameter, the first sound source energy parameter, the second sound source direction parameter and the second sound source energy parameter may comprise generating the filter gain/attenuation for the band based on a combination of the frame smoothing gain/attenuation, the combined temporal gain/attenuation value and the combined band gain/attenuation value.

Processing of the two or more audio signals may comprise providing one or more modified audio signal based on the two or more audio signals, and determining, in the one or more frequency band of the two or more audio signals, a second sound source direction parameter and second sound source energy parameter based on processing of the two or more audio signals may comprise determining, in the one or more frequency band of the two or more audio signals, a second sound source direction parameter and second sound source energy parameter based on the modified audio signal.

Providing one or more modified audio signals based on the two or more audio signals may comprise: generating a modified two or more audio signals based on modifying the two or more audio signals with a projection of a first sound source defined by the first sound source direction parameter; and determining, in the one or more frequency band of the two or more audio signals, at least a second sound source direction parameter at least based in at least in part the one or more modified audio signal comprises determining in the one or more frequency band of the two or more audio signals, the at least a second sound source direction parameter by processing the modified two or more audio signals.

Obtaining the region defining the direction and/or range for the filter may comprise obtaining the region based on a user input.

According to a third aspect there is provided an apparatus comprising at least one processor and at least one memory including a computer program code, the at least one memory and the computer program code configured to, with the at least one processor, cause the apparatus at least to: obtain two or more audio signals from respective two or more microphones; determine, in one or more frequency band of the two or more audio signals, a first sound source direction parameter and first sound source energy parameter based on processing of the two or more audio signals; determine, in the one or more frequency band of the two or more audio signals, a second sound source direction parameter and second sound source energy parameter based on processing of the two or more audio signals; obtain a region defining a direction and/or range for a filter; and generate the filter to be applied to the two or more audio signals, wherein filter gain/attenuation parameters are generated based on the region in relation to the first sound source direction parameter, the first sound source energy parameter, the second sound source direction parameter and the second sound source energy parameter.

The apparatus caused to generate a filter to be applied to the two or more audio signals, wherein filter gain/attenuation parameters are generated based on the region in relation to the first sound source direction parameter, the first sound source energy parameter, the second sound source direction parameter and the second sound source energy parameter may be caused to: generate a first band gain/attenuation value based on the first sound source direction parameter being within or outside the region; generate a second band gain/attenuation value based on the second sound source direction parameter being within or outside the region; and combine the first band gain/attenuation value and the second band gain/attenuation value to generate a combined band gain/attenuation value.

The apparatus caused to obtain the region defining the direction and/or range for the filter may be caused to obtain at least one of: a direction and range defining the region, together with a in-band gain/attenuation factor based on the sound source direction parameter being within the region, and an out-band gain/attenuation factor based on the sound source direction parameter being outside the region; and a direction and range defining the region, together with a in-band gain/attenuation factor based on the sound source direction parameter being within the region, and an out-band gain/attenuation factor based on the sound source direction parameter being outside the region and a further range defining an edge zone region, together with an edge-zone band gain/attenuation factor based on the sound source direction parameter being within the edge-zone region.

The apparatus caused to generate the filter to be applied to the two or more audio signals, wherein filter gain/attenuation parameters are generated based on the region in relation to the first sound source direction parameter, the first sound source energy parameter, the second sound source direction parameter and the second sound source energy parameter may be caused to: generate a first temporal gain/attenuation value based on a temporal average of the mean band value of the first sound source energy parameter and the number of times the first sound source direction parameter is within the region over a defined time period; generate a second temporal gain/attenuation value based on a temporal average of the mean band value of the second sound source energy parameter and the number of times the second sound source direction parameter is within the region over the defined time period; and generate a combined temporal gain/attenuation value based on a combination of the first temporal gain/attenuation value and the second temporal gain/attenuation value to generate a combined temporal gain/attenuation value.

The apparatus caused to generate the filter to be applied to the two or more audio signals, wherein filter gain/attenuation parameters are generated based on the region in relation to the first sound source direction parameter, the first sound source energy parameter, the second sound source direction parameter and the second sound source energy parameter may be caused to: generate a combined frame averaged value based on a combination of a frame averaged first sound source energy parameter and frame averaged second sound source energy parameter; generate a frame smoothing gain/attenuation based on the combined frame averaged value and the number of times the first and second sound source direction parameter is within the filter region over a frame period.

The apparatus caused to generate the filter to be applied to the two or more audio signals, wherein filter gain/attenuation parameters are generated based on the region in relation to the first sound source direction parameter, the first sound source energy parameter, the second sound source direction parameter and the second sound source energy parameter may be caused to generate the filter gain/attenuation for the band based on a combination of the frame smoothing gain/attenuation, the combined temporal gain/attenuation value and the combined band gain/attenuation value.

The processing of the two or more audio signals may be configured to provide one or more modified audio signal based on the two or more audio signals, and wherein the apparatus caused to determine, in the one or more frequency band of the two or more audio signals, a second sound source direction parameter and second sound source energy parameter based on processing of the two or more audio signals may be caused to determine, in the one or more frequency band of the two or more audio signals, a second sound source direction parameter and second sound source energy parameter based on the modified audio signal.

The apparatus caused to provide one or more modified audio signals based on the two or more audio signals may be further caused to: generate a modified two or more audio signals based on modifying the two or more audio signals with a projection of a first sound source defined by the first sound source direction parameter; and the apparatus caused to determine, in the one or more frequency band of the two or more audio signals, at least a second sound source direction parameter at least based in at least in part the one or more modified audio signal is caused to determine in the one or more frequency band of the two or more audio signals, the at least a second sound source direction parameter by processing the modified two or more audio signals.

The apparatus caused to obtain the region defining the direction and/or range for the filter may be caused to obtain the region based on a user input.

According to a fourth aspect there is provided an apparatus comprising: means for obtaining two or more audio signals from respective two or more microphones; means for determining, in one or more frequency band of the two or more audio signals, a first sound source direction parameter and first sound source energy parameter based on processing of the two or more audio signals; means for determining, in the one or more frequency band of the two or more audio signals, a second sound source direction parameter and second sound source energy parameter based on processing of the two or more audio signals; means for obtaining a region defining a direction and/or range for a filter; and means for generating the filter to be applied to the two or more audio signals, wherein filter gain/attenuation parameters are generated based on the region in relation to the first sound source direction parameter, the first sound source energy parameter, the second sound source direction parameter and the second sound source energy parameter.

According to a fifth aspect there is provided a computer program comprising instructions [or a computer readable medium comprising program instructions] for causing an apparatus to perform at least the following: obtain two or more audio signals from respective two or more microphones; determine, in one or more frequency band of the two or more audio signals, a first sound source direction parameter and first sound source energy parameter based on processing of the two or more audio signals; determine, in the one or more frequency band of the two or more audio signals, a second sound source direction parameter and second sound source energy parameter based on processing of the two or more audio signals; obtain a region defining a direction and/or range for a filter; and generate the filter to be applied to the two or more audio signals, wherein filter gain/attenuation parameters are generated based on the region in relation to the first sound source direction parameter, the first sound source energy parameter, the second sound source direction parameter and the second sound source energy parameter.

According to a sixth aspect there is provided a non-transitory computer readable medium comprising program instructions for causing an apparatus to perform at least the following: obtain two or more audio signals from respective two or more microphones; determine, in one or more frequency band of the two or more audio signals, a first sound source direction parameter and first sound source energy parameter based on processing of the two or more audio signals; determine, in the one or more frequency band of the two or more audio signals, a second sound source direction parameter and second sound source energy parameter based on processing of the two or more audio signals; obtain a region defining a direction and/or range for a filter; and generate the filter to be applied to the two or more audio signals, wherein filter gain/attenuation parameters are generated based on the region in relation to the first sound source direction parameter, the first sound source energy parameter, the second sound source direction parameter and the second sound source energy parameter.

According to a seventh aspect there is provided an apparatus comprising: obtaining circuitry configured to obtain two or more audio signals from respective two or more microphones; determining circuitry configured to determine, in one or more frequency band of the two or more audio signals, a first sound source direction parameter and first sound source energy parameter based on processing of the two or more audio signals; determining circuitry configured to determine, in the one or more frequency band of the two or more audio signals, a second sound source direction parameter and second sound source energy parameter based on processing of the two or more audio signals; obtaining circuitry configured to obtain a region defining a direction and/or range for a filter; and generating circuitry configured to generate the filter to be applied to the two or more audio signals, wherein filter gain/attenuation parameters are generated based on the region in relation to the first sound source direction parameter, the first sound source energy parameter, the second sound source direction parameter and the second sound source energy parameter.

According to an eighth aspect there is provided a computer readable medium comprising program instructions for causing an apparatus to perform at least the following: obtain two or more audio signals from respective two or more microphones; determine, in one or more frequency band of the two or more audio signals, a first sound source direction parameter and first sound source energy parameter based on processing of the two or more audio signals; determine, in the one or more frequency band of the two or more audio signals, a second sound source direction parameter and second sound source energy parameter based on processing of the two or more audio signals; obtain a region defining a direction and/or range for a filter; and generate the filter to be applied to the two or more audio signals, wherein filter gain/attenuation parameters are generated based on the region in relation to the first sound source direction parameter, the first sound source energy parameter, the second sound source direction parameter and the second sound source energy parameter.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
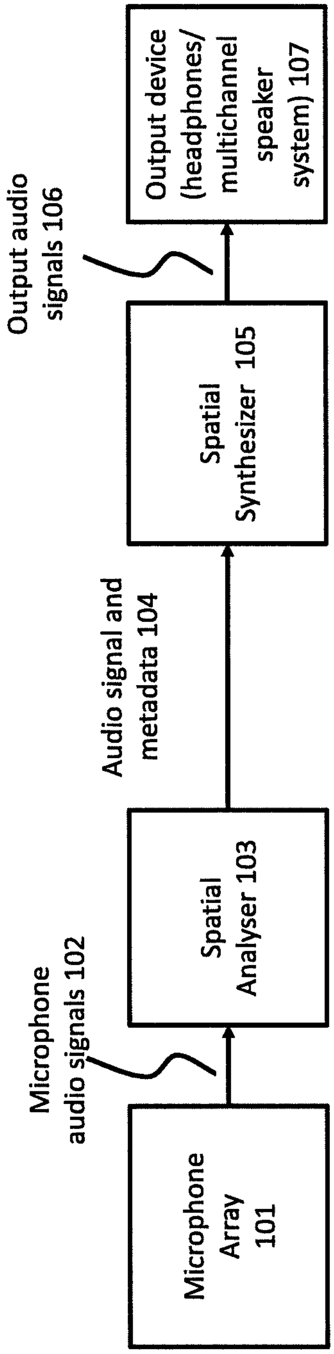
FIG. 1 shows schematically example apparatus for implementing spatial capture and playback according to some embodiments.

The concept as discussed herein in further detail with respect to the following embodiments is related to the capture of audio scenes. For example the following embodiments can be implemented within a capture device side configured to determine object/source related audio signals. For example in some embodiments two source direction estimates and their related direct-to-ambient energy ratios with respect to the sector/zone of interest can be used in determining filter gain/attenuations to 'filter' the object/source related audio signals. This spatial filtering could be used instead of (or even addition to) traditional beamforming to generate object audio signals. In the following embodiments the filter gains parameters are discussed though these same approaches can be used to generation filter attenuation parameters.

Furthermore the following embodiments can also be implemented within a playback device where captured audio is processed by 'zooming' or 'focusing'. Furthermore spatial filtering can be implemented as an optional part of a spatial audio signal synthesis operation.

In the following description the term sound source is used to describe an (artificial or real) defined element within a sound field (or audio scene). The term sound source can also be defined as an audio object or audio source and the terms are interchangeable with respect to the understanding of the implementation of the examples described herein.

The embodiments herein concern parametric audio capture apparatus and methods, such as spatial audio capture (SPAC) techniques. For every time-frequency tile, the apparatus is configured to estimate a direction of a dominant sound source and the relative energies of the direct and ambient components of the sound source, which are expressed as direct-to-total energy ratios.

The following examples are suitable for devices with challenging microphone arrangements or configurations, such as found within typical mobile devices where the dimensions of the mobile device typically comprise at least one short (or thin) dimension with respect to the other dimensions. In the examples shown herein the captured spatial audio signals are suitable inputs for spatial synthesizers in order to generate spatial audio signals such as binaural format audio signals for headphone listening, or to multichannel signal format audio signals for loudspeaker listening.

In some embodiments these examples can be implemented as part of a spatial capture front-end for a Immersive Voice and Audio Services (IVAS) standard codec by producing IVAS compatible audio signals and metadata.

An audio scene (spatial audio environment) can be complex and comprise several simultaneous audio or sound sources with different spectral characteristics. In addition, strong background noise can make it difficult to determine the directions of the sound sources. This can cause problems in filtering the audio field (represented by the captured audio signals), meaning that also sound elements within the audio field that were desired to be filtered out (or attenuated) from the audible sound field leak to the processed output due to insufficiently accurate or reliable spatial audio analysis.

Furthermore simultaneous sound sources, echoing, ambient sound environment etc, real-life audio recording situations often make it challenging to amplify and/or attenuate the desired sound directions with good audio quality. Typically in spatial audio capture methods only a single direction estimate per frequency band is determined and passed to the filter. Thus it can be difficult or practically impossible to distinguish and thus amplify/attenuate audio signal components associated with two simultaneous sound directions existing within the same frequency band. As the direction of at least one of the two simultaneous audio sources remains unknown there can further be problems for so-called audio zooming or audio focusing algorithms, where the goal is to amplify audio signal components (sounds) arriving only from a specified direction and attenuate other directions. The 'unknown' sound source direction(s) might locate at or near the zooming direction, but cannot be amplified without proper DOA estimates. Correspondingly, efficient attenuation of other directions requires the DOA estimates of both sound sources, because otherwise the algorithm may accidentally attenuate also the other sound source at or near the zooming direction, based on the single DOA estimate of another sound source located at other direction far from the zooming direction.

The embodiments as described herein aim to improve the way that sound sources can be amplified and/or attenuated as requested by the user, by implementing an improved (multiple) two-direction estimation method for each frequency band. The estimation method provides additional information about the audio environment and sound source directions for filtering. In other words providing (multiple) two direction estimates and their direct-to-ambient energy ratios per subband, enabling more efficient spatial filtering. The increased efficiency is based on combining the computed filtering gains corresponding to (all) both DOA estimates and their energy ratios. This, instead, increases and strengthens the perceived audio zooming effect, enabling audio zooming to be used in more complex sound environments in terms of sound sources number and location.

The embodiments further aim to improve the perceived audio quality, due to the improved derivation of filtering gains/attenuations. The improvement results from being able to take at least one previous frame's DOA estimates (for example the DOA estimates from the last 40 frames) and energy ratios of (all) both directions into account when forming the filtering gains for the current time frame.

The embodiments thus aim to prevent 'disturbing' filter leakage into the output from the directions that were supposed to be filtered or attenuated. This therefore strengthens the perceived audio zooming effect and prevents confusing user experience when several sound sources exist in the capture. Moreover, the target (focus) direction can be amplified in relation to the other sound directions efficiently in complex environments, again strengthening the zooming effect experience.

Thus the embodiments described herein are related to parametric spatial audio capture with two or more microphones. Furthermore at least two direction and energy ratio parameters are estimated in every time-frequency tile based on the audio signals from the two or more microphones.

In these embodiments the effect of the first estimated direction is taken into account when estimating the second direction in order to achieve improvements in the multiple sound source direction detection accuracy. This can in some embodiments result in an improvement in the perceptual quality of the synthesized spatial audio.

Thus it can be possible to use similar techniques such as described in EP3791605 but implemented in the manner as described herein.

In practice the embodiments described herein produce estimates of, the sounds sources which are perceived to be spatially more stable and more accurate (with respect to their correct or actual positions).

With respect to FIG. 1 is shown a schematic view of apparatus suitable for implementing the embodiments described herein.

In this example is shown the apparatus comprising a microphone array 101. The microphone array 101 comprises multiple (two or more) microphones configured to capture audio signals. The microphones within the microphone array can be any suitable microphone type, arrangement or configuration. The microphone audio signals 102 generated by the microphone array 101 can be passed to the spatial analyser 103.

The apparatus can comprise a spatial analyser 103 configured to receive or otherwise obtain the microphone audio signals 102 and is configured to spatially analyse the microphone audio signals in order to determine at least two dominant sound or audio sources for each time-frequency block.

The spatial analyser can in some embodiments be a CPU of a mobile device or a computer. The spatial analyser 103 is configured to generate a data stream which includes audio signals as well as metadata of the analyzed spatial information 104.

Depending on the use case, the data stream can be stored or compressed and transmitted to another location.

The apparatus furthermore comprises a spatial synthesizer 105. The spatial synthesizer 105 is configured to obtain the data stream, comprising the audio signals and the metadata. In some embodiments spatial synthesizer 105 is implemented within the same apparatus as the spatial analyser 103 (as shown herein in FIG. 1) but can furthermore in some embodiments be implemented within a different apparatus or device.

The spatial synthesizer 105 can be implemented within a CPU or similar processor. The spatial synthesizer 105 is configured to produce output audio signals 106 based on the audio signals and associated metadata from the data stream 104.

Furthermore depending on the use case, the output signals 106 can be any suitable output format. For example in some embodiments the output format is binaural headphone signals (where the output device presenting the output audio signals is a set of headphones/earbuds or similar) or multichannel loudspeaker audio signals (where the output device is a set of loudspeakers).

The output device 107 (which as described above can for example be headphones or loudspeakers) can be configured to receive the output audio signals 106 and present the output to the listener or user.

Figure 2:
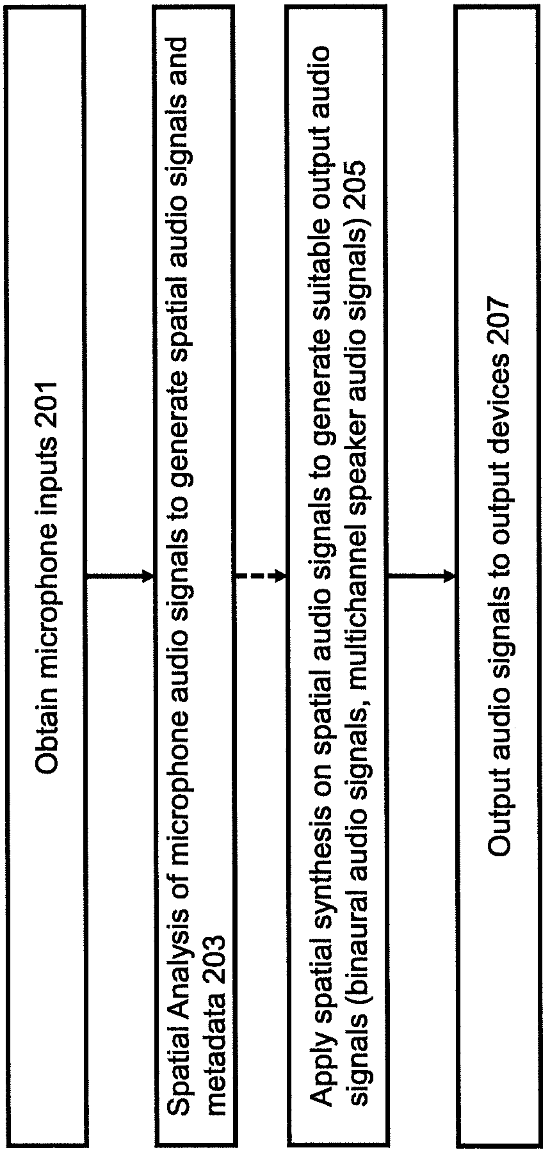
FIG. 2 shows a flow diagram of the operations of the apparatus shown in FIG. 1 according to some embodiments.

These operations of the example apparatus shown in FIG. 1 can be shown by the flow diagram shown in FIG. 2. The operations of the example apparatus thus be summarized as the following.

Obtaining the microphone audio signals as shown in FIG. 2 by step 201.

Spatially analysing the microphone audio signals to generate spatial audio signals and metadata comprising directions and energy ratios for a first and second audio source for each time-frequency tile as shown in FIG. 2 by step 203.

Applying spatial synthesis to the spatial audio signals to generate suitable output audio signals as shown in FIG. 2 by step 205.

Outputting the output audio signals to the output device as shown in FIG. 2 by step 207.

In some embodiments the spatial analysis can be used in connection with the IVAS codec. In this example the spatial analysis output is a IVAS compatible MASA (metadata-assisted spatial audio) format which can be fed directly into an IVAS encoder. The IVAS encoder generates a IVAS data stream. At the receiving end the IVAS decoder is directly capable of producing the desired output audio format. In other words in such embodiments there is no separate spatial synthesis block.

Figure 3:
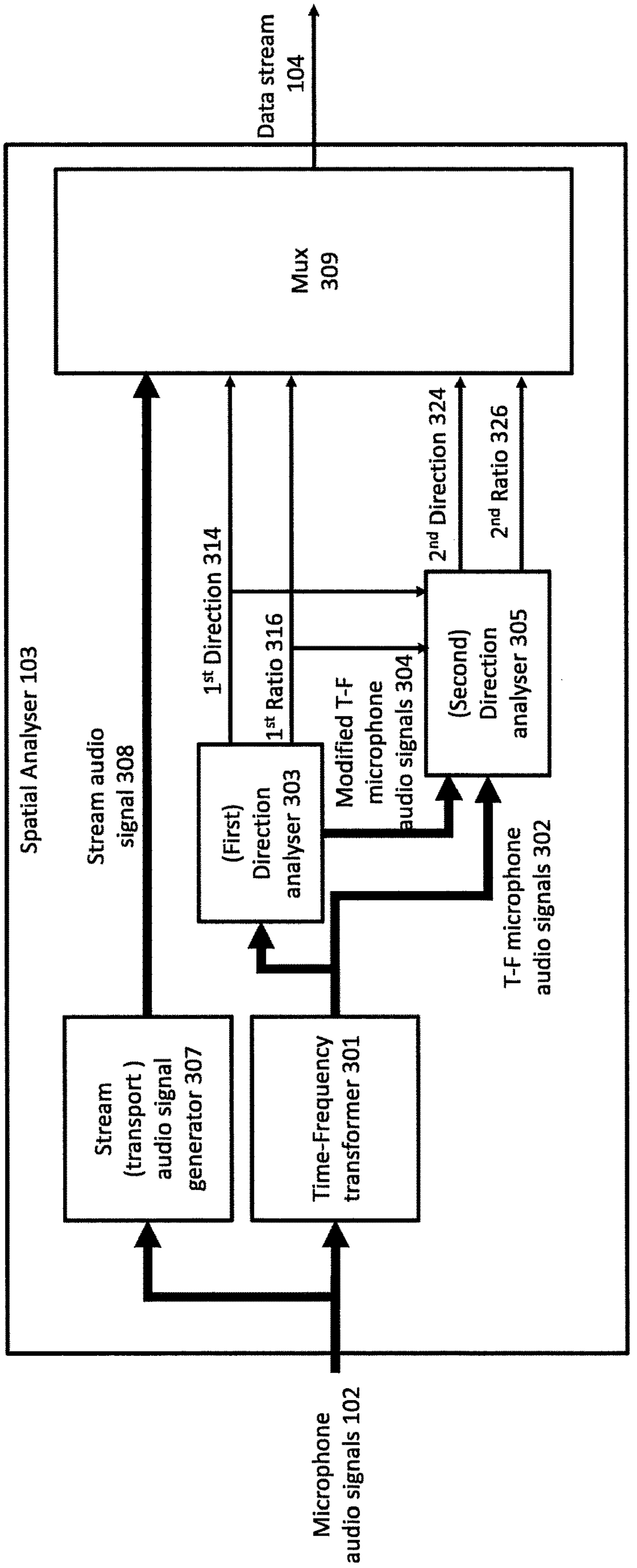
FIG. 3 shows schematically an example spatial analyser as shown in FIG. 1 according to some embodiments.

The spatial analyser shown in FIG. 1 by reference 103 is shown in further detail with respect to FIG. 3.

The spatial analyser 103 in some embodiments comprises a stream (transport) audio signal generator 307. The stream audio signal generator 307 is configured to receive the microphone audio signals 102 and generate a stream audio signal(s) 308 to be passed to a multiplexer 309. The audio stream signal is generated from the input microphone audio signals based on any suitable method. For example, in some embodiments, one or two microphone signals can be selected from the microphone audio signals 102. Alternatively, in some embodiments the microphone audio signals 102 can be downsampled and/or compressed to generate the stream audio signal 308.

In the following example the spatial analysis is performed in the frequency domain, however it would be appreciated that in some embodiments the analysis can also be implemented in the time domain using the time domain sampled versions of the microphone audio signals.

The spatial analyser 103 in some embodiments comprises a time-frequency transformer 301. The time-frequency transformer 301 is configured to receive the microphone audio signals 102 and convert them to the frequency domain. In some embodiments before the transform, the time domain microphone audio signals can be represented as $s_i(t)$, where t is the time index and i is the microphone channel index. The transformation to the frequency domain can be implemented by any suitable time-to-frequency transform, such as STFT (Short-time Fourier transform) or QMF (Quadrature mirror filter). The resulting time-frequency domain microphone signals 302 are denoted as $S_i(b,n)$, where i is the microphone channel index, b is the frequency bin index, and n is the temporal frame index. The value of b is in range 0, . . . , B−1, where B is the number of bin indexes at every time index n.

The frequency bins can be further combined into subbands k=0, . . . , K−1. Each subband consists of one or more frequency bins. Each subband k has a lowest bin $b_{k,low}$ and a highest bin $b_{k,high}$. The widths of the subbands are typically selected based on properties of human hearing, for example equivalent rectangular bandwidth (ERB) or Bark scale can be used.

In some embodiments the spatial analyser 103 comprises a first direction analyser 303. The first direction analyser 303 is configured to receive the time-frequency domain microphone audio signals 302 and generate estimates for a first sound source for each time-frequency tile of a (first) $1^{st}$ direction 314 and (first) $1^{st}$ ratio 316.

The first direction analyser 303 is configured to generate the estimates for the first direction based on any suitable method such as SPAC (as described in further detail in U.S. Pat. No. 9,313,599).

In some embodiments for example the most dominant direction for a temporal frame index is estimated by searching a time shift $\tau_k$ that maximizes a correlation between two (microphone audio signal) channels for the subband k. $S_i(b,n)$ can be shifted by r samples as follows:

$$S_{i,\tau}(b,n) = S_{i,\tau}(b,n)e^{-j\frac{2\pi b\tau}{B}}$$

Then find the delay $\tau_k$ for each subband k which maximises the correlation between two microphone channels:

$$c(k,n) = \max_{\tau} \sum_{b=b_{k,low}}^{b_{k,high}} \mathrm{Re}\left(S_{2,\tau}^{*}(b,n)S_1(b,n)\right),\ \tau \in [-D_{max}, D_{max}]$$

In the above equation, the 'optimal' delay is searched between the microphones 1 and 2. Re indicates the real part of the result, and * is the complex conjugate of the signal. The delay search range parameter $D_{max}$ is defined based on the distance between microphones. In other words the value of $\tau_k$ is searched only on the range which is physically possible considering the distance between the microphones and the speed of sound.

The angle of the first direction can then be defined as $$\hat{\theta}_1(k,n) = \pm\cos^{-1}\left(\frac{\tau_k}{D_{max}}\right)$$

As shown, there is still uncertainty of the sign of the angle.

Above, the direction analysis between microphones 1 and 2 was defined. A similar procedure can then be repeated between other microphone pairs as well to resolve the ambiguity (and/or obtain a direction with reference to another axis). In other words the information from other analysis pairs can be utilized to get rid of the sign ambiguity in $\hat{\theta}_1(k,n)$.

For example where the microphone array comprises three microphones, a first microphone, second microphone and third microphone which are arranged in configuration where there is a first pair of microphones (first microphone and third microphone) separated by a distance in a first axis and a second pair of microphones (first microphone and second microphone) separated by a distance in a second axis (where in this example the first axis is perpendicular to the second axis). Additionally the three microphones can in this example be on the same third axis which is defined as the one perpendicular to the first and second axis (and perpendicular to the plane of the paper on which the figure is printed). The analysis of delay between the second pair of microphones and results in two alternative angles, $\alpha$ and $-\alpha$. An analysis of the delay between the second pair of microphones and can then be used to determine which of the alternative angles is the correct one. In some embodiments the information required from this analysis is whether the sound arrives first at microphone 1 or 3. If the sound arrives at microphone 3, angle $\alpha$ is correct. If not, $-\alpha$ is selected.

Furthermore based on inference between several microphone pairs the first spatial analyser can determine or estimate the correct direction angle $\hat{\theta}_1(k,n) \rightarrow \theta_1(k,n)$.

In some embodiments where there is a limited microphone configuration or arrangement, for example only two microphones, the ambiguity in the direction cannot be solved. In such embodiments the spatial analyser is configured to define that all sources are always in front of the device. The situation is the same also when there are more than two microphones, but their locations do not allow for example front-back analysis.

Although not disclosed herein multiple pairs of microphones on perpendicular axes can determine elevation and azimuth estimates.

The first direction analyser 303 can furthermore determine or estimate an energy ratio $r_1(k,n)$ corresponding to angle $\theta_1(k,n)$ using, for example, the correlation value c(k,n) after normalizing it, e.g., by $$r_1(k,n) = \sum\nolimits_{b=b_{k,low}}^{b_{k,high}} \mathrm{Re}\left(S_{2,\tau_k}^{*}(b,n)S_1(b,n)\right) \Big/ \sum\nolimits_{b=b_{k,low}}^{b_{k,high}} \left(|S_{2,\tau_k}(b,n)||S_1(b,n)|\right)$$

The value of $r_1(k,n)$ is between −1 and 1, and typically it is further limited between 0 and 1.

In some embodiments the first direction analyser 303 is configured to generate modified time-frequency microphone audio signals 304. The modified time-frequency microphone audio signal 304 is one where the first sound source components are removed from the microphone signals.

Thus for example with respect to the first microphone pair (microphones 1 and 2). For a subband k the delay which provides the highest correlation is $\tau_k$. For every subband k the second microphone signal is shifted $\tau_k$ samples to obtain a shifted second microphone signal $S_{2,\tau_k}(b,n)$.

An estimate of the sound source component can be determined as an average of these time aligned signals:

$$C(b,n) = \frac{S_1(b,n) + S_{2,\tau_k}(b,n)}{2}$$

In some embodiments any other suitable method for determining the sound source component can be used.

Having determined (for example in the example equation above) an estimate of the sound source component C(b,n) this can then be removed from the microphone audio signals. On the other hand, other simultaneous sound sources are not in phase, which causes that they are attenuated. Now, we can reduce C(b,n) from the (shifted and unshifted) microphone signals $$\hat{S}_1(b,n) = S_1(b,n) - C(b,n) = \frac{S_1(b,n)}{2} - \frac{S_{2,\tau_k}(b,n)}{2}$$

$$\hat{S}_{2,\tau_k}(b,n) = S_{2,\tau_k}(b,n) - C(b,n) = \frac{S_{2,\tau_k}(b,n)}{2} - \frac{S_1(b,n)}{2} = -\hat{S}_1(b,n)$$

Furthermore the shifted modified microphone audio signal is shifted back $\hat{S}_{2,\tau_k}(b,n)\tau_k$ samples to obtain $$\hat{S}_2(b,n) = \hat{S}_{2,\tau_k}(b,n)e^{j\frac{2\pi b\tau_k}{B}}$$

These modified signals $\hat{S}_1(b,n)$ and $\hat{S}_2(b,n)$ can then be passed to the second direction analyser 305.

In some embodiments the spatial analyser 103 comprises a second direction analyser 305. The second direction analyser 305 is configured to receive the time-frequency microphone audio signals 302, the modified time-frequency microphone audio signals 304, the first direction 314 and first ratio 316 estimates and generate second direction 324 and second ratio 326 estimates.

The estimation of the second direction parameter values can employ the same subband structure as for the first direction estimates and follow similar operations as described earlier for the first direction estimates.

Thus it can be possible to estimate the second direction parameters $\theta_2(k,n)$ and $$r_2'(k, n).$$

In such embodiments the modified time-frequency microphone audio signals 304 $\hat{S}_1(b,n)$ and $\hat{S}_2(b,n)$ are used rather than the time-frequency microphone audio signals 302 $S_1(b,n)$ and $S_2(b,n)$ to determine the direction estimate.

Furthermore in some embodiments the energy ratio $$r_2'(k, n)$$

is limited though, as the sum of the first and second ratio should not sum to more than one.

In some embodiments the second ratio is limited by $$r_2(k, n) = (1 - r_1(k, n))r_2'(k, n)$$

or $$r_2(k, n) = \min(r_2'(k, n), 1 - r_1(k, n))$$

where function min selects smaller one of the provided alternatives. Both alternative options have been found to provide good quality ratio values.

It is noted that in the above examples as there are several microphone pairs, modified signals have to be calculated separately for each pair, i.e., $\hat{S}_1(b,n)$ is not the same signal when considering microphone pair microphone 1 and 3, or pair microphone 1 and 2.

The first direction estimate 314, first ratio estimate 316, second direction estimate 324, second ratio estimate 326 are passed to the multiplexer (mux) 309 which is configured to generate a data stream 104 from combining the estimates and the stream audio signal 308.

Figure 4:
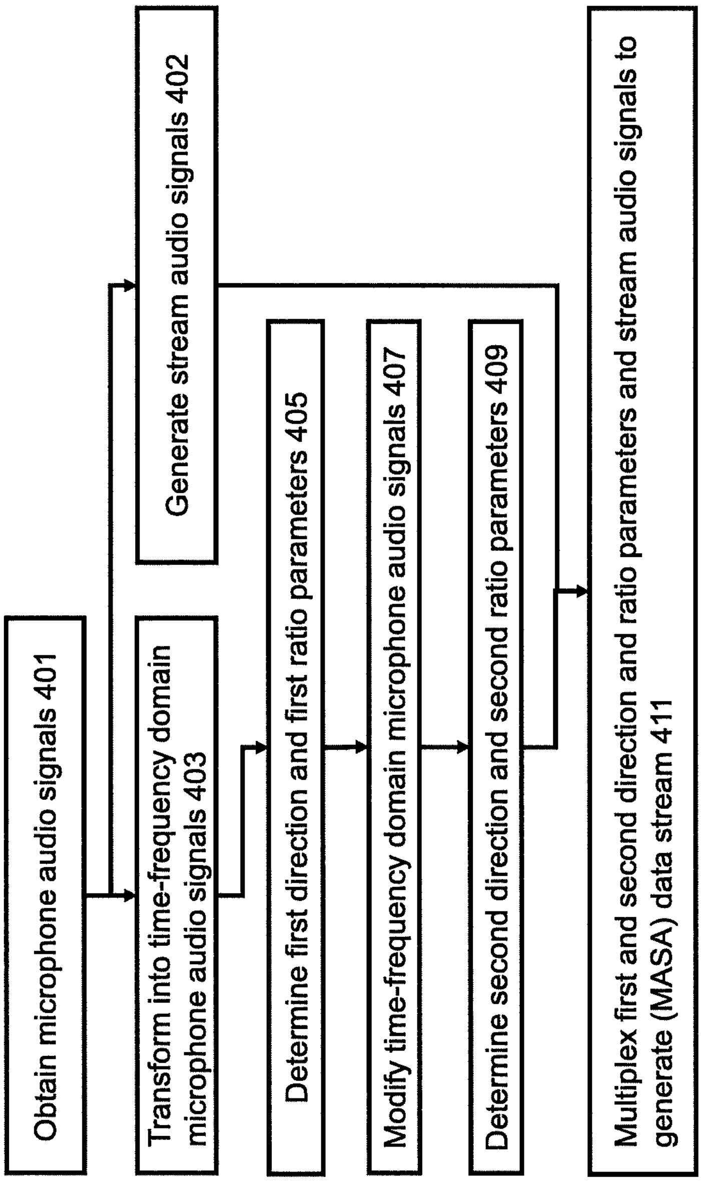
FIG. 4 shows a flow diagram of the operations of the example spatial analyser shown in FIG. 3 according to some embodiments.

With respect to FIG. 4 is shown a flow diagram summarizing the example operations of the spatial analyser shown in FIG. 3.

Microphone audio signals are obtained as shown in FIG. 4 by step 401.

The stream audio signals are then generated from the microphone audio signals as shown in FIG. 4 by step 402.

The microphone audio signals can furthermore be time-frequency domain transformed as shown in FIG. 4 by step 403.

First direction and first ratio parameter estimates can then be determined as shown in FIG. 4 by step 405.

The time-frequency domain microphone audio signals can then be modified (to remove the first source component) as shown in FIG. 4 by step 407.

Then the modified time-frequency domain microphone audio signals are analysed to determine second direction and second ratio parameter estimates as shown in FIG. 4 by step 409.

Then the first direction, first ratio, second direction and second ratio parameter estimates and the stream audio signals are multiplexed to generate a data stream (which can be a MASA format data stream) as shown in FIG. 4 by step 411.

In the following examples a spatial filtering method and apparatus is described wherein several gain parameters are determined or computed and set to adjust the filtering process. These gains can be divided into band-wise gains, history-based (temporal) gains and frame-based smoothing gains.

In the following examples the two estimated directions (DOAs) per subband are provided with direct-to-ambient (DA) ratio estimates, which basically indicate how large a portion of the corresponding direction estimates are considered as a "direct" signal part and how much is considered as an "ambient" signal part. In these examples the term direct refers to the signal arriving directly from the sound source, while ambient refers to echoes and background noise existing in the environment.

The direct and ambient component of the signal for each subband b can have a range [0, 1] and defined as:

$$\text{dirEne}(b)=\text{ratio}(b),$$

$$\text{ambEne}(b)=1-\text{ratio}(b).$$

In some embodiments the method starts, following obtaining the direction and range of the spatial filtering zone (which can also be defined as the sector of interest of focus or zoom sector), by checking through the subbands whether either, neither or both of the two direction estimates are located inside the sector of interest. In the following examples the spatial filtering is a positive notch filtering wherein audio signals within the sector of interest are increased relative to audio signals outside of the sector of interest. However in some embodiments the spatial filtering is a negative notch filtering wherein audio signals within the sector of interest are diminished relative to audio signals outside of the sector of interest. It would be appreciated that the difference between the two would be whether the sector gain is greater than the out-of-sector gain which would result in a positive spatial notch filter or the sector gain is less than the out-of-sector gain which would result in a negative spatial notch filter.

Figure 5:
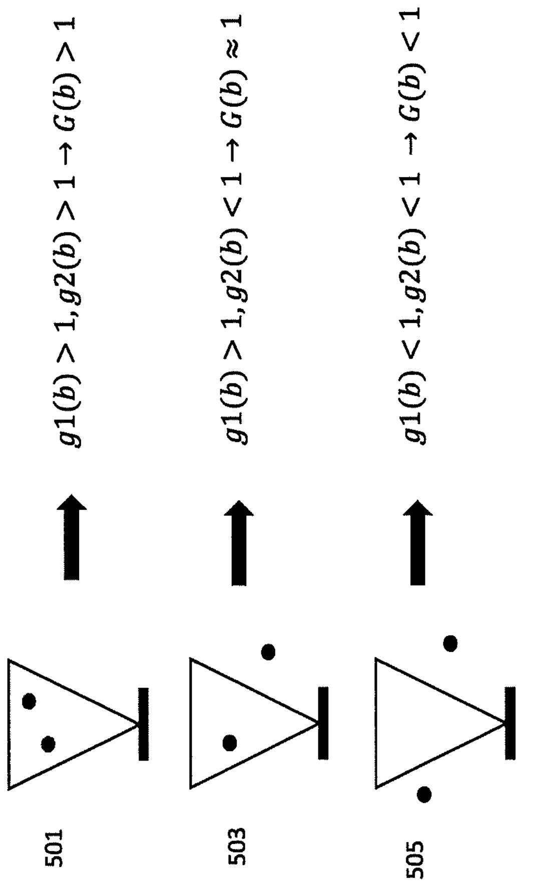
FIG. 5 shows an example situation where sound sources are located within or outside a zone of interest.

A simplified illustration of these three main scenarios is shown with respect to FIG. 5.

In this example the sounds are amplified inside the sector and attenuated outside of it, but the processing is also significantly affected by the direction estimate's DA-ratios.

For example DA-ratio estimates can be considered as weights for the actual direction estimates. The numbers in the table below are only examples to demonstrate the basic principles of their effect on deriving a filtering gain G(b). The first two rows demonstrate the case where either of the two sources is estimated as an ambient-like sound, meaning that its direction estimate should not be used as such for filtering.

| ratio1(b) | ratio2(b) | G(b) |
|---|---|---|
| <0.1 | >0.9 | ~g2(b) |
| >0.9 | <0.1 | ~g1(b) |
| ~0.5 | ~0.5 | g1(b) * g2(b) |

Thus a low DA-ratio value can indicate that the corresponding direction estimate may not be caused by a real sound source, as in some cases there are no direct sound sources active during the capture, or there is only one source. In some embodiments the sector edges can also have a region where the applied subband gains are linearly smoothed to avoid sudden gain changes at the sector edges.

Thus as shown in FIG. 5, there is a first scenario 501 wherein both of the sound sources are within the sector which will result in the filtering gains corresponding to each direction estimate g1(b), g2(b) are both greater than one and thus the spatial gain G(b) will result in a value greater than one.

There is shown a second scenario 503 wherein one of the sound sources is within the sector filtering gains corresponding to one direction estimate (the first g1(b)) being greater than one and the other (the second g2(b)) is less than one and thus the spatial gain G(b) will result in a value approximating to one.

Additionally is shown a third scenario 505 where both of the sound sources are outside the sector which will result in the filtering gains corresponding to each direction estimate g1(b), g2(b) being less than one and thus the spatial gain G(b) will result in a value less than one.

In some embodiments, the energy of a subband b of the input signal spectrum X(b) before any energy adjustments can be estimated as:

$$\text{bandEne}(b)=\text{bandEne}(b)*\text{IIRFactor},$$

$$\text{bandEne}(b)=\text{bandEne}(b)+X(b)^2,$$

where IIRFactor<1.0 defines how big portion of the previous time frame energy is included to smooth the energy level between time frames. The energies at each subband b can be initialized to bandEne(b)=0 before the first frame.

Band gains in some embodiments are derived for each subband b based on the direction estimates d1 and d2 of the band. The direction estimates may locate inside the focus sector, outside of the focus sector, or at the region near the sector edges (a so-called edge zone). A direct energy component for the first direction estimate d1 for subband b can be modified as:

$$dirEne1(b)=\begin{cases} dirEne1(b)*inGain, & \text{for estimates inside of sector}\\ dirEne1(b)*outGain, & \text{for estimates outside of sector}\\ interpGain1*outGain+(1-interpGain\,1)*inGain, & \text{for estimates at edge zone}\end{cases}$$

where inGain and outGain are tunable and/or user-defined parameters to control the focus effect strength for sources inside and outside of the focus sector, and $$\text{interpGain1}=\text{angleDiff1}/\text{edgeWidth},$$

where angleDiff1 is the observed angle difference between the first direction estimate d1 and the sector edge, while edgeWidth is the width of the edge zone, e.g. 20 degrees. Furthermore in some embodiments an ambient signal part for the first direction estimate for the subband b can be modified as:

$$\text{ambEne1}(b)=\text{ambEne1}(b)*\text{outGain},$$

after which total energy adjustment of subband b is computed $$\text{totalEne1}(b)=\text{dirEne1}(b)+\text{ambEne1}(b).$$

The target energy, which is initialized to 0 before the first frame, for the band b after energy adjustment can be defined as:

$$\text{targetEne1}(b)=\text{targetEne1}(b)*\text{IIRFactor},$$

$$\text{targetEne1}(b)=\text{targetEne1}(b)+\text{bandEne}(b)*\text{totalEne1}(b),$$

after which the actual band gain value for the subband b corresponding the first direction estimate d1 is computed as $$g1(b)=\sqrt{\frac{targetEne1(b)}{bandEne(b)}}$$

In order to take the second direction estimate d2 into account, the g2(b) gain values are computed similarly as g1(b) values, after which the gains are multiplied to obtain the overall band gain $$g(b)=g1(b)*g2(b).$$

Furthermore in some embodiments a temporal filtering gain is computed for each subband for both direction estimates d1 and d2 to smooth the filtering gain over time. This prevents unnatural sudden pumps and notches in the overall filter gain. In many cases the estimated sound source DA-ratio values may vary across the subbands, which is why averaging DA-ratio over the whole filtering frequency range provides a good estimate of how ambient-like the sound environment is at the current time frame f. The ratio mean value is computed at each frame for the first direction estimate as:

$$\overline{\text{ratio1}(f)}=\frac{\sum_{b=b_{low}}^{b_{high}}\text{ratio1}(b)}{(b_{high}-b_{low})},$$

where $b_{low}$ is the lowest and $b_{high}$ the highest frequency subband to be filtered. In addition, a track is kept of the past ratio mean values over a preferred number of previous frames, i.e. the history length, which can be a user-defined and/or tunable parameter. The computed mean ratios are then further averaged over the history segment to obtain a temporal ratio mean:

$$\overline{\text{ratio1}_t}=\frac{\sum_{f=1}^{frames}\overline{\text{ratio}(f)}}{\text{frames}},$$

where frames is the number of frames in the history segment, e.g. 60. For the second direction estimate d2, a temporal ratio mean is further scaled as:

$$\overline{\text{ratio2}_t}=\frac{\overline{rati\ _t}}{(1-\overline{\text{ratio1}_t})},$$

which is more suitable for filtering weight purposes than the original DA-ratio scale. For each subband b and both direction estimates d1 and d2, also the amount of past direction estimates inside the focus sector is tracked using a Boolean flag (indicating whether the subband's direction estimate at the current frame f is inside the focus sector or not).

$$\text{flag1}(f)(b) = \begin{cases} 1, & \text{if direction estimate inside sector} \\ 0, & \text{if direction estimate outside sector} \end{cases}.$$

Once the history segment is filled with such flags, the number of 'true' flags at each subband b for d1, $N1_T(b)$ is used to obtain a temporary scaling variable $$scaleVar1(b) = \frac{1}{tempGain} + \frac{N1_T(b)}{\text{frames}} * tempGain,$$

where tempGain is a tunable and/or user-defined parameter with typical values [1.0, . . . 6.0]. As can be seen, the scaling variable decreases as 'true' flags decrease and vice versa. Finally, temporal gain for d1 is computed as $$g1_t(b) = \text{scaleVar1}(b) * (\overline{\text{ratio1}_t} + \text{bias}),$$

where bias is a constant between 0 and 1 to control how much weight is given for the DA-ratio values in deriving temporal gains. Typically the value could be set e.g. ~0.4-0.6.

The number of direction estimates inside the sector at each subband b in the past, $N1_T(b)$ can also be used to provide a so-called attenuation status for later use as follows $$\text{attenuate1}(b) = \begin{cases} \text{true}, & N1_T(b) \geq \text{frames}/2 \\ \text{false}, & N1_T(b) < \text{frames}/2 \end{cases}.$$

Temporal gain $g2_t(b)$ for direction estimate d2 is computed similarly than for d1, and the actual temporal filter gain is obtained by multiplication $$g_t(b) = g1_t(b) * g2_t(b).$$

In some embodiments direction estimates over all the subbands within a single time frame may vary significantly depending on the number and type of sound sources existing in the sound environment. Hence, to prevent sudden pumps and notches in the spectral envelope at each frame, additional frame smoothing gains are needed to smooth the spectrum. First, sum of the ratio means of d1 and d2 can be computed as:

$$\overline{\text{ratioSum}} = \overline{\text{ratio1}(f)} + \overline{\text{ratio2}(f)},$$

next, the ratio of in-sector estimates, $N_{in}$, over all the direction estimates within the frame, N, is used to compute smoothing factor:

$$smoothFactor = \frac{N_{in}}{N} * \overline{ratioSum},$$

which is then applied for frame gain computation $$g_f = \left(\frac{1}{smoothGain}\right) + ((smoothGain - 1) * smoothFactor),$$

where smoothGain is a tunable gain parameter with typical values [1.0, . . . 2.0]. Higher values provide more efficient filtering performance, but they may cause unwanted gain level pumping especially when loud background noise is present in the capture.

The attenuation status derived earlier is used to compute the actual filter smoothing gains for each subband:

$$g1_s(b) = \begin{cases} g_f, & \text{attenuate1}(b) = \text{false} \\ g_f * g_{att}, & \text{attenuate1}(b) = \text{true} \end{cases},$$

where $g_{att}<1$ is a tunable attenuation gain. The smoothing gain for d2 is computed likewise, and the overall smoothing gain is obtained by multiplication:

$$g_s(b) = g1_s(b) * g2_s(b).$$

Once all the different gain types: band gains, temporal gains and frame gains, have been computed, the actual output filter gains can be determined or computed for each subband b as:

$$G(b) = g(b) * g_t(b) * g_s(b)$$

and the output is compressed and limited according to available headroom in the following processing chain.

Figure 6:
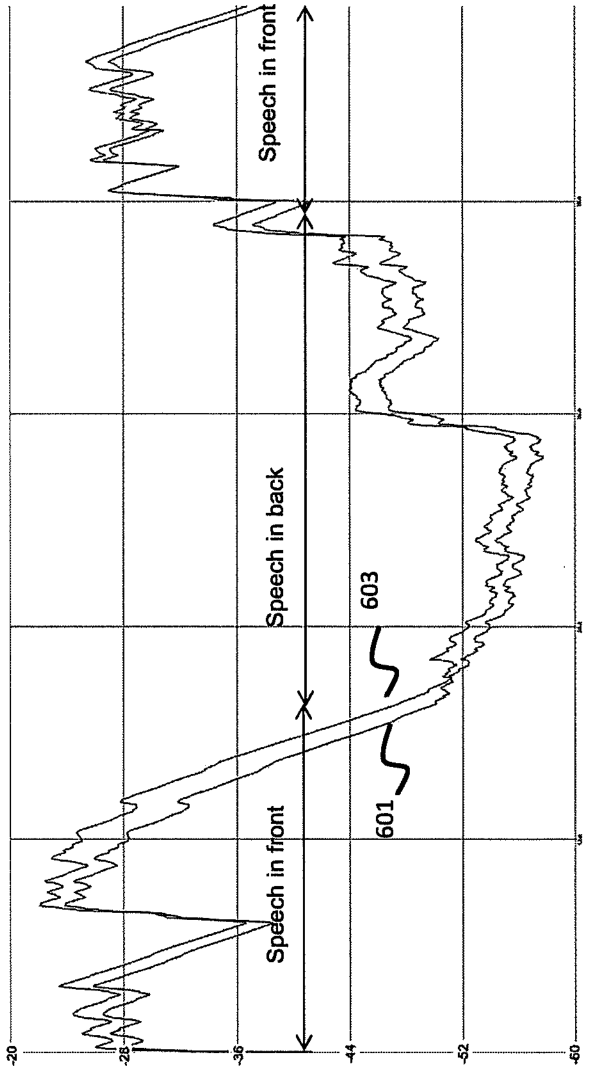
FIG. 6 shows an example graph of signal level of spatial filters.

An example of advantages of implementing the embodiments as described herein is shown in FIG. 6. Specifically FIG. 6 shows output signal levels in dB of a known spatial filter using only a single direction estimate per subband 601 and the spatial filter approach according to some embodiments 603. In this example, the audio focus direction is set directly to the front of the device and the signal consists of a speaker speaking in front of the device at the beginning, then moving to the behind of the device in the middle of the signal, and finally returning to the front of the device again. In addition, music is played from a speaker located to the left of the capture device. It can be seen, that on average the embodiments amplify the speech from the front approximately 2-3 dB more in comparison to the known method.

In addition, the embodiments also attenuates the speech from behind the device 2-3 dB more when compared to the known spatial filtering method, meaning that altogether the embodiments increase the overall focus effect gain on average 4-6 dB. This is a clearly audible and significant difference that improves the perceived audio zooming experience in most cases. As long as the direction estimates d1 and d2 can be estimated from the capture, the spatial filter can always improve its performance compared to having only the estimate d1.

Figure 7:
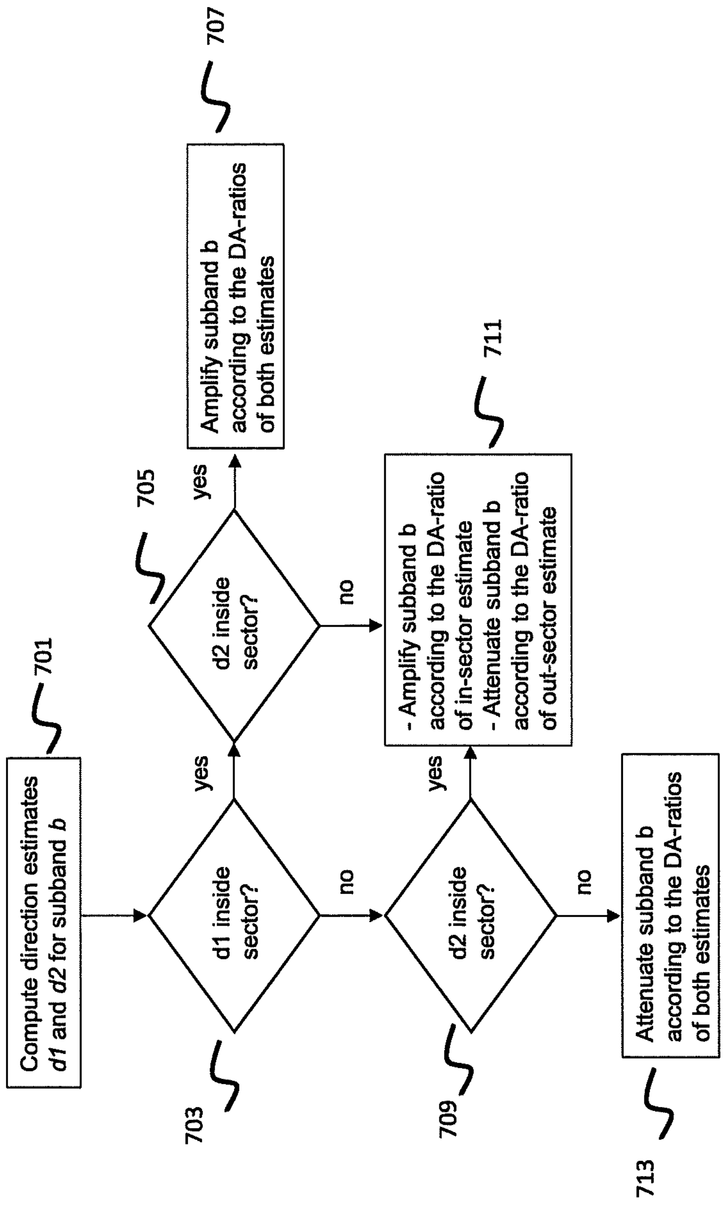
FIG. 7 shows a flow diagram of spatial filtering operations determining the sound source is within the zone of interest based on the two sound source direction estimation according to some embodiments.

With respect to FIG. 7 is shown the summary of the operations of embodiments as described herein.

The first operation is to compute or determine direction estimates for d1 and d2 for a sub-band b as shown in FIG. 7 by step 701.

Then a first check can be implemented to determine whether d1 is within the sector as shown in FIG. 7 by step 703.

Where d1 is within the sector then the further check can be made to determine whether d2 is within the sector as shown in FIG. 7 by step 705.

Where both d1 and d2 are within the sector then the sub-band b is amplified according to the DA-ratios of both the d1 and d2 associated estimates as shown in FIG. 707.

Where d1 is not within the sector then a further check can be made to determine whether d2 is within the sector as shown in FIG. 7 by step 709.

Where d1 is within the sector but d2 is not, or d1 is not within the sector but d2 is within the sector, then sub-band b can be amplified according to the DA-ratio of the in-sector estimate and attenuate the sub-band b according to the DA-ratio of the out-sector estimate as shown in FIG. 7 by step 711.

Where both d1 and d2 are outside the sector then the sub-band b is attenuated according to the DA-ratios of both the d1 and d2 associated estimates as shown in FIG. 713.

Figure 8:
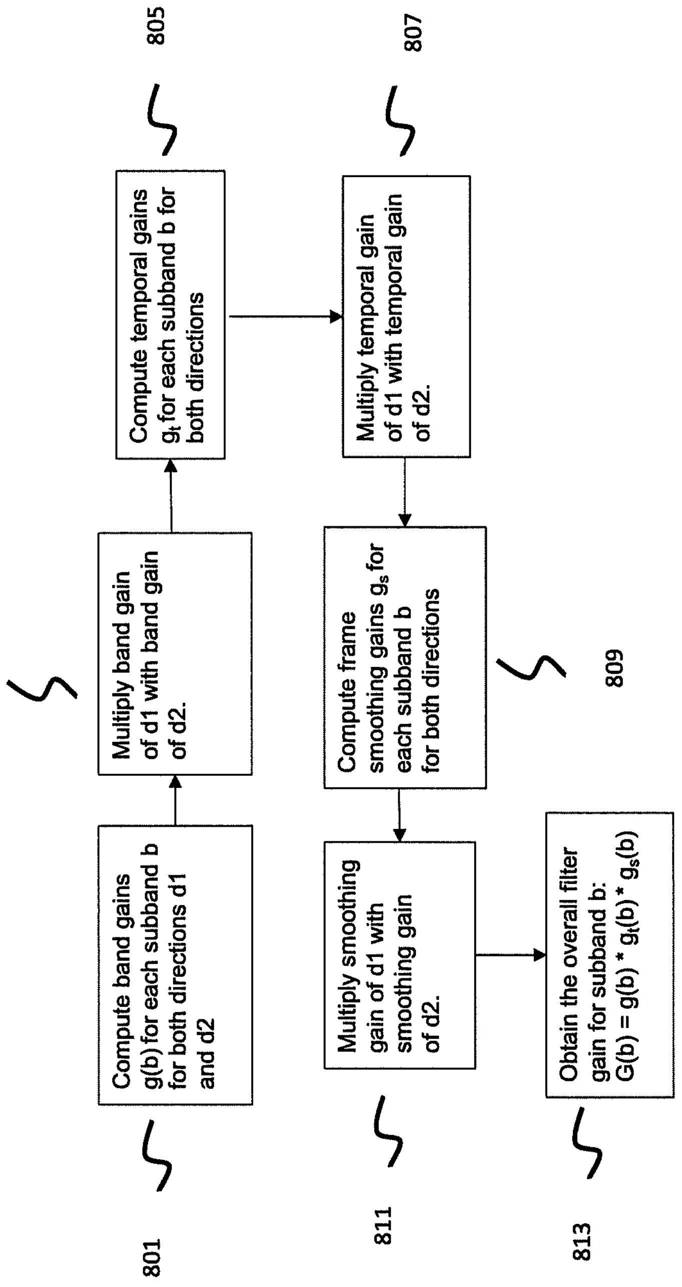
FIG. 8 shows a flow diagram of spatial filtering based on the two sound source direction estimation according to some embodiments.

With respect to FIG. 8 is shown a flow diagram showing the generation of the gains according to some embodiments.

Thus in some embodiments band gains g(b) are computed for both directions $$g1(b)=\sqrt{\frac{targetEne1(b)}{bandEne(b)}}\quad g2(b)=\sqrt{\frac{targetEne2(b)}{bandEne(b)}}$$

as shown in FIG. 8 by step 801.

Then in some embodiments the band gains are multiplied together to generate a combined band gain g(b)=g1(b)*g2(b) as shown in FIG. 8 by step 803.

Then temporal gains are generated $g1_t(b)$, $g2_t(b)$ for each subband and direction as shown in FIG. 8 by step 805.

The temporal gains can then be multiplied together to generate a combined temporal gain $g_t(b)=g1_t(b)*g2_t(b)$ as shown in FIG. 8 by step 807.

Then frame smoothing gains $g1_s(b)$, $g2_s(b)$ for each sub-band and direction can then be determined as shown in FIG. 8 by step 809.

The frame smoothing gains can then be multiplied together to generate a combined frame smoothing gain $g_r(b)=g1_r(b)*g2_r(b)$ as shown in FIG. 8 by step 811.

Then the overall filter gain for the sub-band can be generated for the sub-band b by multiplying the combined frame smoothing gain, the combined temporal gain and the combined band gains $G(b)=g(b)*g_r(b)*g_s(b)$ as shown in FIG. 8 by step 813.

Figure 9:
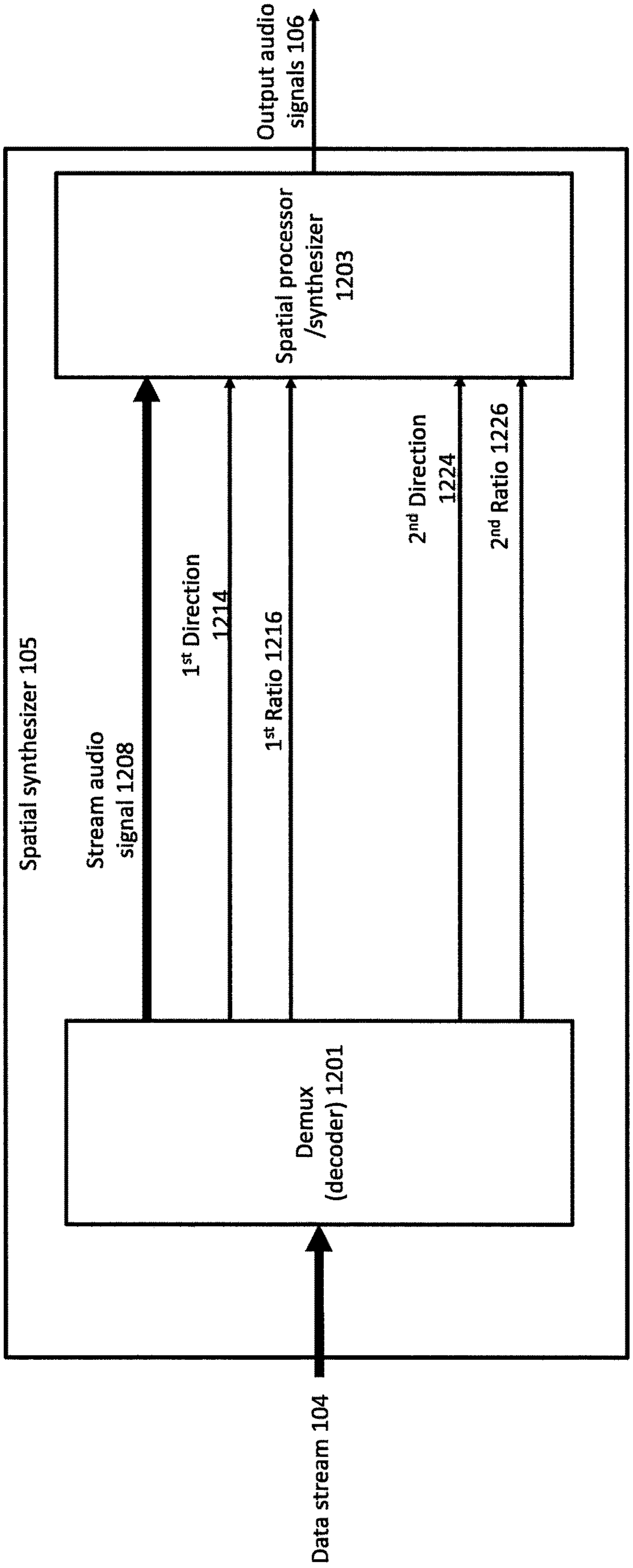
FIG. 9 shows schematically an example spatial synthesizer as shown in FIG. 2 according to some embodiments.

With respect to FIG. 9 is shown an example spatial synthesizer 105 as shown in FIG. 1.

The spatial synthesizer 105 in some embodiments comprises a demultiplexer 1201. The demultiplexer (Demux) 1201 in some embodiments receives the data stream 104 and separates the datastream into stream audio signal 1208 and spatial parameter estimates such as the first direction 1214 estimate, the first ratio 1216 estimate, the second direction 1224 estimate, and the second ratio 1226 estimate.

These are then passed to the spatial processor/synthesizer 1203.

The spatial synthesizer 105 comprises a spatial processor/synthesizer 1203 and is configured to receive the estimates and the stream audio signal and render the output audio signal. The spatial processing/synthesis can be any suitable two direction based synthesis, such as described in EP3791605.

Figure 10:
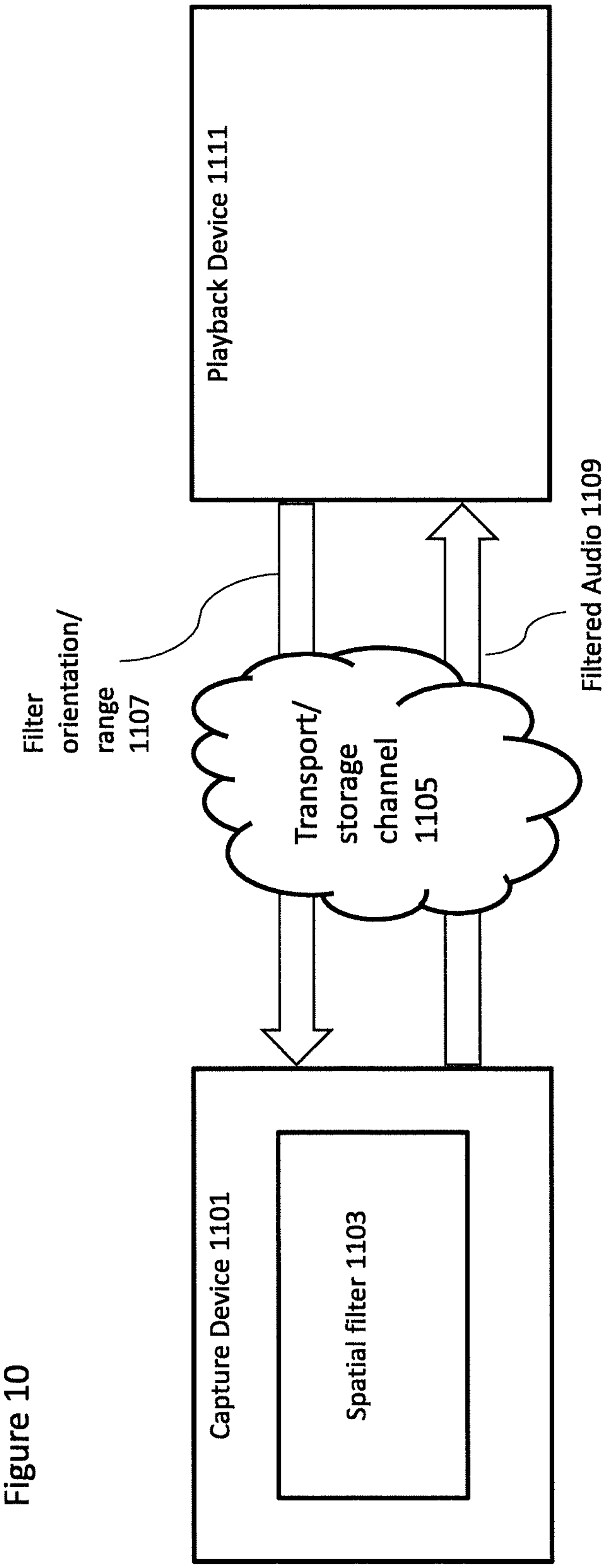
FIGS. 10 and 11 shows schematically example systems of apparatus comprising the apparatus as shown in earlier figures suitable for implementing embodiments.
Figure 11:
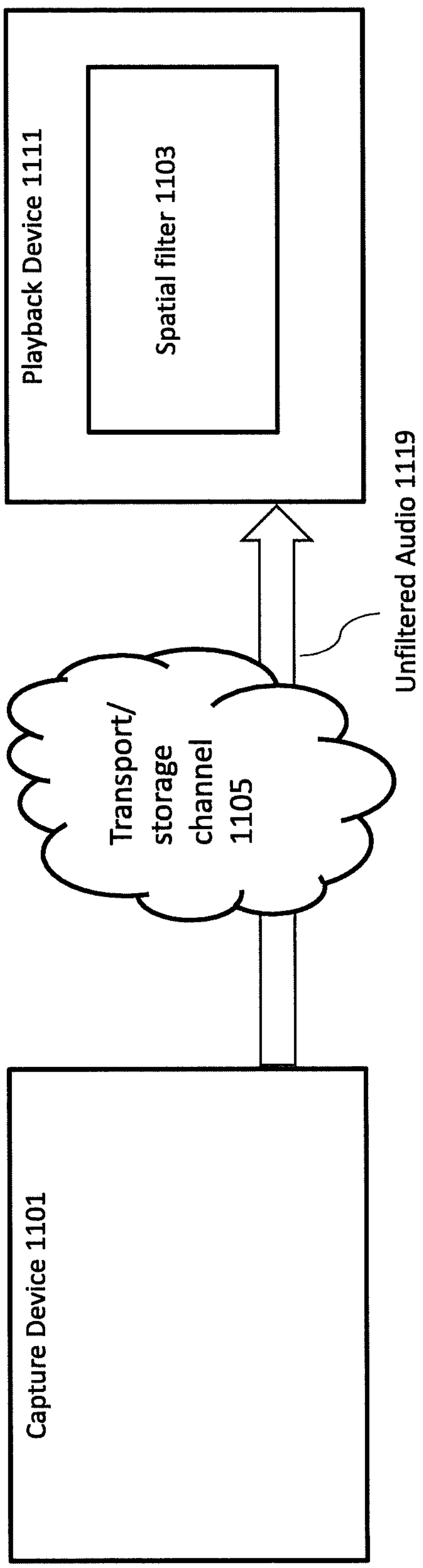

FIGS. 10 and 11 show end-to-end implementation of embodiments. With respect to FIG. 10 it is shown that there is a capture device 1101 and a playback device 1111 which communicate over a transport/storage channel 1105.

The capture device 1101 is configured as described above and is configured to send filtered audio 1109. In addition, filter orientation/range information 1107 can be received from the playback device 1111.

With respect to FIG. 11 is shown the capture device 1101 configured to send unfiltered audio 1119 which is received by the playback device 1111. The playback device comprises the spatial filter 1103 configured to apply the spatial filtering as discussed in the embodiments described herein.

Figure 12:
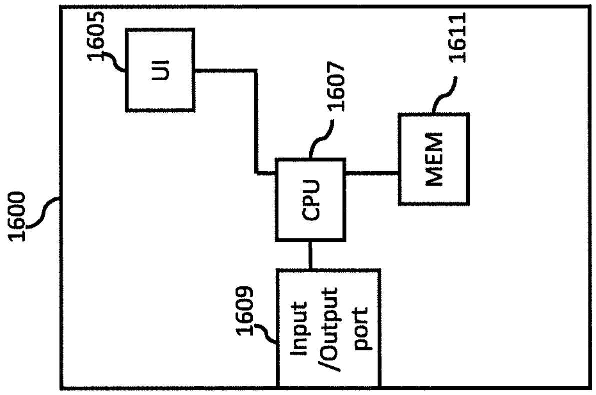
FIG. 12 shows schematically an example device suitable for implementing the apparatus shown.

With respect to FIG. 12 an example electronic device which may be used as the computer, encoder processor, decoder processor or any of the functional blocks described herein is shown. The device may be any suitable electronics device or apparatus. For example in some embodiments the device 1600 is a mobile device, user equipment, tablet computer, computer, audio playback apparatus, etc.

In some embodiments the device 1600 comprises at least one processor or central processing unit 1607. The processor 1607 can be configured to execute various program codes such as the methods such as described herein.

In some embodiments the device 1600 comprises a memory 1611. In some embodiments the at least one processor 1607 is coupled to the memory 1611. The memory 1611 can be any suitable storage means. In some embodiments the memory 1611 comprises a program code section for storing program codes implementable upon the processor 1607. Furthermore in some embodiments the memory 1611 can further comprise a stored data section for storing data, for example data that has been processed or to be processed in accordance with the embodiments as described herein. The implemented program code stored within the program code section and the data stored within the stored data section can be retrieved by the processor 1607 whenever needed via the memory-processor coupling.

In some embodiments the device 1600 comprises a user interface 1605. The user interface 1605 can be coupled in some embodiments to the processor 1607. In some embodiments the processor 1607 can control the operation of the user interface 1605 and receive inputs from the user interface 1605. In some embodiments the user interface 1605 can enable a user to input commands to the device 1600, for example via a keypad. In some embodiments the user interface 1605 can enable the user to obtain information from the device 1600. For example the user interface 1605 may comprise a display configured to display information from the device 1600 to the user. The user interface 1605 can in some embodiments comprise a touch screen or touch interface capable of both enabling information to be entered to the device 1600 and further displaying information to the user of the device 1600.

In some embodiments the device 1600 comprises an input/output port 1609. The input/output port 1609 in some embodiments comprises a transceiver. The transceiver in such embodiments can be coupled to the processor 1607 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1609 may be configured to transmit/receive the audio signals, the bitstream and in some embodiments perform the operations and methods as described above by using the processor 1607 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media, and optical media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose-computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory including instructions, the at least one memory and the instructions configured to, with the at least one processor, cause the apparatus at least to:

obtain two or more audio signals from respective two or more microphones;

determine, in one or more frequency bands of the two or more audio signals, a first sound source direction parameter and a first sound source energy parameter based on processing of the two or more audio signals;

determine, in the one or more frequency bands of the two or more audio signals, a second sound source direction parameter and second sound source energy parameter at least based on processing at least one modified audio signal based on the two or more audio signals;

obtain a region defining a direction and/or a range for a filter; and generate the filter to be applied to the two or more audio signals, wherein filter gain/attenuation parameters are generated based on the region in relation to the first sound source direction parameter, the first sound source energy parameter, the second sound source direction parameter and the second sound source energy parameter.

2. The apparatus as claimed in claim 1, wherein the at least one memory and the instructions are configured to, with the at least one processor and the generated filter, cause the apparatus at least to:

generate a first band gain/attenuation value based on the first sound source direction parameter being within or outside the region;

generate a second band gain/attenuation value based on the second sound source direction parameter being within or outside the region; and combine the first band gain/attenuation value and the second band gain/attenuation value to generate a combined band gain/attenuation value.

3. The apparatus as claimed in claim 2, wherein the at least one memory and the instructions are configured to, with the at least one processor and the obtained region, cause the apparatus to obtain at least one of:

the direction and/or the range defining the region, together with an in-band gain/attenuation factor based on the first or second sound source direction parameter being within the region, and an out-band gain/attenuation factor based on the first or second sound source direction parameter being outside the region; or the direction and/or the range defining the region, together with an in-band gain/attenuation factor based on the first or second sound source direction parameter being within the region, and an out-band gain/attenuation factor based on the first or second sound source direction parameter being outside the region and a further range defining an edge zone region, together with an edge-zone band gain/attenuation factor based on the first or second sound source direction parameter being within the edge-zone region.

4. The apparatus as claimed in claim 2, wherein the at least one memory and the instructions are configured to, with the at least one processor and the generated filter, cause the apparatus to:

generate a first temporal gain/attenuation value based on a temporal average of the mean band value of the first sound source energy parameter and a number of times the first sound source direction parameter is within the region over a defined time period;

generate a second temporal gain/attenuation value based on a temporal average of the mean band value of the second sound source energy parameter and a number of times the second sound source direction parameter is within the region over the defined time period; and generate a combined temporal gain/attenuation value based on a combination of the first temporal gain/attenuation value and the second temporal gain/attenuation value.

5. The apparatus as claimed in claim 4, wherein the generated filter is configured to be applied to the two or more audio signals, and wherein the at least one memory and the instructions are configured to, with the at least one processor and the generated filter gain/attenuation parameters, cause the apparatus to:

generate a combined frame averaged value based on a combination of a frame averaged first sound source energy parameter and a frame averaged second sound source energy parameter; and generate a frame smoothing gain/attenuation based on the combined frame averaged value and the number of times the first and second sound source direction parameters are within the region for the filter over a frame period.

6. The apparatus as claimed in claim 4, wherein the generated filter is configured to be applied to the two or more audio signals, and wherein the at least one memory and the instructions are configured to, with the at least one processor and the generated filter gain/attenuation parameters, cause the apparatus to generate the filter gain/attenuation parameters for the one or more frequency bands of the two or more audio signals based on a combination of the generated frame smoothing gain/attenuation, the combined temporal gain/attenuation value and the combined band gain/attenuation value.

7. The apparatus as claimed in claim 1, wherein the apparatus is configured such that the processing of the two or more audio signals causes the apparatus to provide one or more modified audio signal based on the two or more audio signals, and wherein the apparatus is caused to determine, in the one or more frequency bands of the two or more audio signals, the second sound source direction parameter and the second sound source energy parameter based on processing of the two or more audio signals cause the apparatus to determine, in the one or more frequency bands of the two or more audio signals, the second sound source direction parameter and the second sound source energy parameter based on the modified audio signal.

8. The apparatus as claimed in claim 7, wherein the at least one memory and the instructions are configured to, with the at least one processor and the provided one or more modified audio signals, cause the apparatus to generate a modified two or more audio signals based on modifying the two or more audio signals with a projection of a first sound source defined with the first sound source direction parameter.

9. The apparatus as claimed in claim 1, wherein the obtained region defining the direction and/or the range for the filter is based on a user input.

10. A method for an apparatus, the method comprising:

obtaining two or more audio signals from respective two or more microphones;

determining, in one or more frequency bands of the two or more audio signals, a first sound source direction parameter and a first sound source energy parameter based on processing of the two or more audio signals;

determining, in the one or more frequency band of the two or more audio signals, a second sound source direction parameter and a second sound source energy parameter at least based on processing at least one modified audio signal based on the two or more audio signals; obtaining a region defining a direction and/or a range for a filter; and generating the filter to be applied to the two or more audio signals, wherein filter gain/attenuation parameters are generated based on the region in relation to the first sound source direction parameter, the first sound source energy parameter, the second sound source direction parameter and the second sound source energy parameter.

11. The method as claimed in claim 10, wherein generating a filter to be applied to the two or more audio signals, wherein filter gain/attenuation parameters are generated based on the region in relation to the first sound source direction parameter, the first sound source energy parameter, the second sound source direction parameter and the second sound source energy parameter comprises:

generating a first band gain/attenuation value based on the first sound source direction parameter being within or outside the region;

generating a second band gain/attenuation value based on the second sound source direction parameter being within or outside the region; and combining the first band gain/attenuation value and the second band gain/attenuation value to generate a combined band gain/attenuation value.

12. The method as claimed in claim 11, wherein obtaining the region defining the direction and/or the range for the filter comprises at least one of:

the direction and/or range defining the region, together with an in-band gain/attenuation factor based on the first or second sound source direction parameter being within the region, and an out-band gain/attenuation factor based on the first or second sound source direction parameter being outside the region; or the direction and/or range defining the region, together with an in-band gain/attenuation factor based on the first and second sound source direction parameter being within the region, and an out-band gain/attenuation factor based on the fist or second sound source direction parameter being outside the region and a further range defining an edge zone region, together with an edge-zone band gain/attenuation factor based on the first or second sound source direction parameter being within the edge-zone region.

13. The method as claimed in claim 11, wherein generating the filter to be applied to the two or more audio signals, wherein filter gain/attenuation parameters are generated based on the region in relation to the first sound source direction parameter, the first sound source energy parameter, the second sound source direction parameter and the second sound source energy parameter comprises:

generating a first temporal gain/attenuation value based on a temporal average of the mean band value of the first sound source energy parameter and a number of times the first sound source direction parameter is within the region over a defined time period;

generating a second temporal gain/attenuation value based on a temporal average of the mean band value of the second sound source energy parameter and a number of times the second sound source direction parameter is within the region over the defined time period; and generating a combined temporal gain/attenuation value based on a combination of the first temporal gain/attenuation value and the second temporal gain/attenuation value.

14. The method as claimed in claim 13, wherein generating the filter to be applied to the two or more audio signals, wherein filter gain/attenuation parameters are generated based on the region in relation to the first sound source direction parameter, the first sound source energy parameter, the second sound source direction parameter and the second sound source energy parameter comprises:

generating a combined frame averaged value based on a combination of a frame averaged first sound source energy parameter and frame averaged second sound source energy parameter; and generating a frame smoothing gain/attenuation based on the combined frame averaged value and the number of times the first and second sound source direction parameters are within the region for the filter over a frame period.

15. The method as claimed in claim 13, wherein generating the filter is to be applied to the two or more audio signals, and wherein filter gain/attenuation parameters are generated comprises generating the filter gain/attenuation parameters for the one or mre frequency bands of the two or more audio signals based on a combination of the frame smoothing gain/attenuation, the combined temporal gain/attenuation value and the combined band gain/attenuation value.

16. The method as claimed in claim 10, wherein processing of the two or more audio signals comprises providing one or more modified audio signals based on the two or more audio signals, and determining, in the one or more frequency bands of the two or more audio signals, the second sound source direction parameter and the second sound source energy parameter based on processing of the two or more audio signals comprises determining, in the one or more frequency bands of the two or more audio signals, the second sound source direction parameter and the second sound source energy parameter based on the modified audio signal.

17. The method as claimed in claim 16, wherein providing the one or more modified audio signals based on the two or more audio signals comprises:

generating a modified two or more audio signals based on modifying the two or more audio signals with a projection of a first sound source defined with the first sound source direction parameter.

18. The method as claimed in claim 10, wherein obtaining the region defining the direction and/or the range for the filter comprises obtaining the region based on a user input.

19. The apparatus as claimed in claim 8, wherein the at least one memory and the instructions are configured to, with the at least one processor and the provided one or more modified audio signals, further causes the apparatus to determine the second sound source direction parameter with processing the modified two or more audio signals.

20. The method as claimed in claim 18, wherein providing one or more modified audio signals based on the two or more audio signals further comprises determining, in the one or more frequency bands of the two or more audio signals, the second sound source direction parameter based at least in part on the one or more modified audio signals comprises determining in the one or more frequency bands of the two or more audio signals, the second sound source direction parameter with processing the modified one or more audio signals.

21. A non-transitory program storage device readable by an apparatus, tangibly embodying a program of instructions executable with the apparatus for performing operations, the operations comprising the method as claimed in claim 10.

* * * * *